Figure 1:
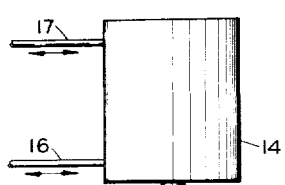

May 22, 1956

J. A. WEEDMAN 2,747,001

CRYSTAL PURIFICATION PROCESS

Filed June 9, 1950

2 Sheets-Sheet 1

INVENTOR.
J. A. WEEDMAN
BY *Hudson & Young*
ATTORNEYS

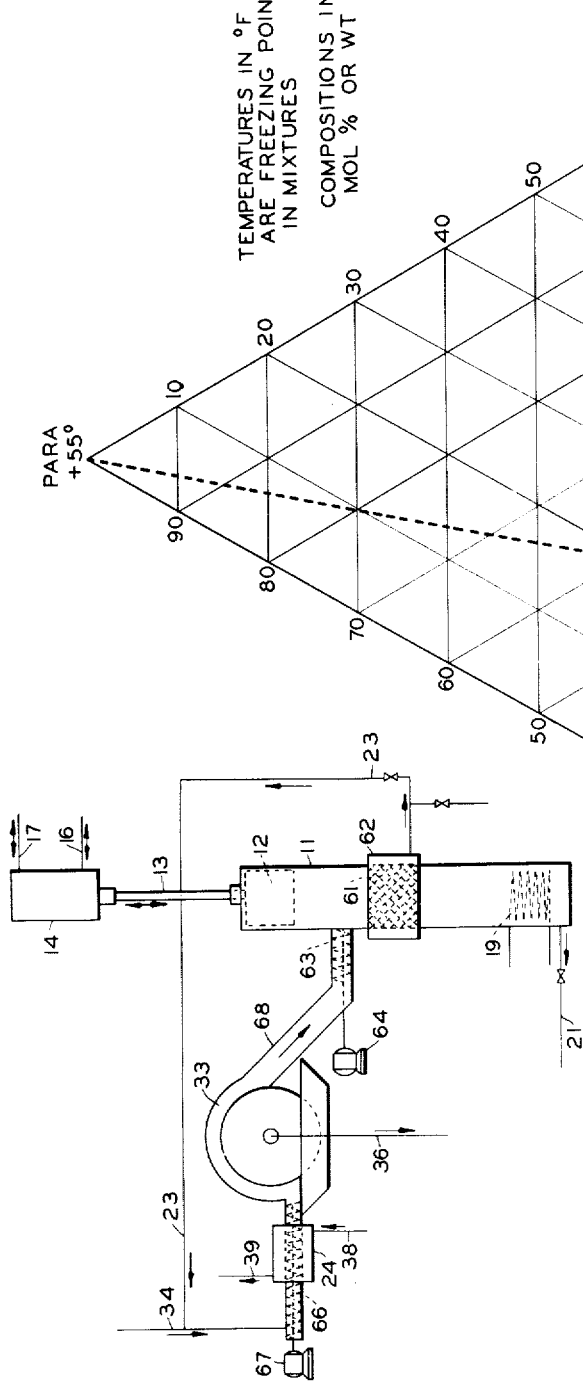
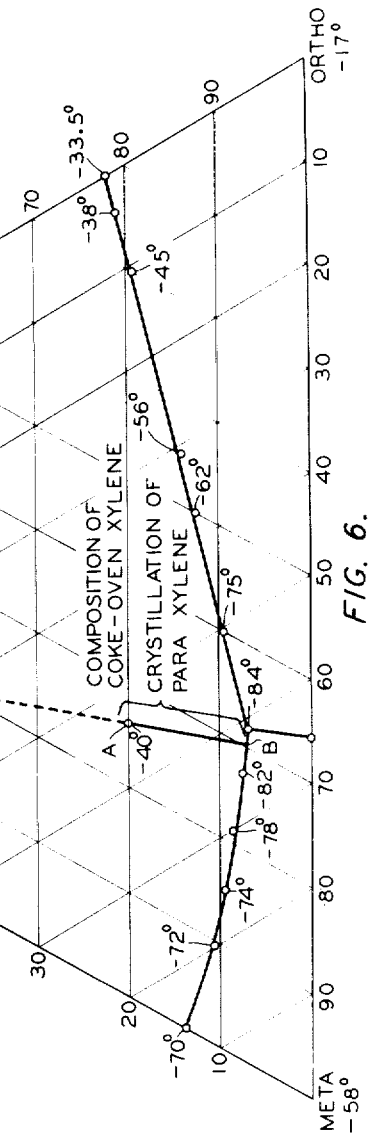

United States Patent Office 2,747,001
Patented May 22, 1956

2,747,001

CRYSTAL PURIFICATION PROCESS

John A. Weedman, Bartlesville, Okla., assignor to Phillips Petroleum Company, a corporation of Delaware Application June 9, 1950, Serial No. 166,992

19 Claims. (Cl. 260—674)

This invention relates to a process and apparatus for crystal separation and purification from liquid mixtures of organic compounds. A specific aspect of the invention pertains to the purification of crystals containing occluded impurities.

This application is related to my copending application, Serial No. 111,618, filed August 22, 1949, now Patent No. 2,615,793.

Separation of compounds may be effected by distillation, solvent extraction, and crystallization. Although distillation and extraction are generally preferred because of economy and convenience of operation, this is not always true. Many chemical isomers have similar boiling points and solubilities and can be separated only by crystallization. Separation by crystallization has one great advantage over other methods in that it is the only separation method which theoretically offers a pure product in a single stage of operation. Thus whereas distillation and extraction theoretically require infinite stages for a pure product, crystallization requires only one. This is because of phase equilibrium in distillation and extraction but crystals separating from a solution are pure, regardless of liquid composition, the only impurity being occluded mother liquor within the crystal interstices. Thus whereas separation by distillation and extraction becomes more difficult as the purity of the product increases, separation by crystallization becomes easier.

Crystallization is thus well suited not only to separate many chemical isomers which can be separated by no other means but also to purify many compounds which cannot be economically purified by other means. Whereas one stage of crystallization theoretically offers a pure product, attainment of this ideal stage has been difficult. Complete removal of occluded impurities without loss in yield is required. This invention describes such a method which closely approaches the ideal crystallization stage.

Separation of relatively pure organic compounds from mixtures of compounds may be effected by chemical methods or by either fractional distillation or fractional crystallization. Fractional distillation is frequently utilized where boiling points are sufficiently separated, but where the components of the system to be separated have relatively close boiling points fractional crystallization is more suitable. Even with these methods it has been difficult to recover substantially pure compounds of research grade. A recent method of separating and purifying organic compounds has been devised which involves introducing the system to be separated into an elongated crystallization and purification column, maintaining a freezing section in one end and a melting section for the higher melting component in the opposite end, forming a slurry of crystals and moving the crystals slowly through the column toward the melting section and there maintaining a melt. The crystals in moving toward the melting section displace melted, more nearly pure, compound and thereby cause a reflux stream of the compound of higher purity toward the freezing section. A fraction of the melt is continuously withdrawn from the melting section of the column as a product of the process. This separation and purification method is effective in producing relatively pure product but is slow and tedious, producing very small yields and thus far has not been found to be commercially practical.

I have devised a method and apparatus for separating and purifying organic compounds which produces compounds of 99.99% purity with high and continuous yields. The process is applicable to binary and multi-component liquid organic mixtures which are eutectic-forming. The only systems to which it is not applicable are mixtures of compounds which form solid solutions. The process involves cooling the system from which the separation is to be made so as to form crystals of at least the higher melting component where the composition of the system is on that side of the eutectic favoring crystallization of the higher melting compound. These crystals are then filtered or otherwise removed from the mother liquor and introduced under pressure into a purification column in which a melting section is maintained in one end thereof. The column of crystals is maintained compact and is continuously or intermittently moved in a compact mass toward the melting section of the purification zone. It has been found that it is essential to maintain the mass of crystals in compact form and remove only a portion of the melt from the melting section so as to force the remaining portion of the melt back through the column of crystals as a reflux in order to produce extremely high purity product at commercially practical rates.

A principal object of the invention is to provide a process and apparatus for separation and purification of components of liquid organic mixtures which effect high yields of pure product at high production rates. It is also an object of the invention to provide a process for the production of research grade organic compounds. Another object of the invention is to provide a process for purification of crystals of an organic compound containing occluded impurities. A further object of the invention is to improve the efficiency of a crystal purification process and apparatus. Other objects of the invention will become apparent from a consideration of the accompanying disclosure.

Utilizing a small and simple apparatus designed in accordance with one modification of the invention, comprising a 2-inch diameter tube 18-inches long equipped with a piston at one end and a heating coil at the other, I have been able to separate benzene of a purity above 99% from a mixture containing only 50% benzene at the rate of 0.9 gallon per hour. I have also produced substantially pure para-xylene from a mixture of meta- and para-xylenes. The process of the invention closely approaches one perfect crystallization stage and is sufficient for the separation of all organic mixtures which form eutectics.

The process of the invention is effected in either a horizontal or vertical purification column, but preferably the latter. The crystal component to be separated and purified may be frozen out by any suitable means such as in a low temperature freezing exchanger equipped with a scraping device for freeing the crystals from the walls of the exchanger. The crystals are then separated from the mother liquor by any conventional means such as on a rotary or suction type filter, or the crystals may be lifted out of the mother liquor with a perforate type scoop or bucket and introduced or forced into the purification column by means of a solid or porous piston. Any means or method of obtaining crystals relatively free of mother liquor is within the scope of the invention. The crystals in a compact contiguous mass are introduced into the purification column or zone either above or below the piston. In the former case the piston has a hinged segment which rotates toward the axis of the column on the compression side of the piston on the intake stroke so as to allow crystals to bypass the piston and replenish crystals melted during a given stroke. In the modification of the invention in which the crystals are introduced to the column below the level of the piston at the end of the compression stroke, it is desirable to force the crystals into the column by means of an auger or a piston. In this modification the piston in the purification column may be either solid or perforate. When using the porous or perforate form of piston, reflux liquid passes through the piston and is withdrawn from the column at any point above the piston. In apparatus utilizing a solid piston in the purification column, it is necessary to withdraw reflux melt through the side of the column at a point below the level of the piston on the compression stroke. This may be accomplished by withdrawing the reflux through a liquid-previous, crystal-impervious perforate section of the column wall just below the piston level.

By continuously melting the end of the compact column of crystals at the melting section of the column, withdrawing only a portion of the melt, and applying pressure to the opposite end of the column of crystals, the remaining portion of the melt is forced countercurrently to the movement of crystals in intimate contact therewith so as to remove the occluded impurities therefrom. It is believed that the high purity obtained is due at least in part to the forced washing action of the relatively pure melt passing through the column of crystals. It has been found that the purity of the crystals progressively increases from the piston end of the column to the melting section thereof as might be expected in this type of operation. The amount of reflux which is required to produce a melt of 99+% purity depends upon the physical and chemical characteristics of the crystals and the amount of occluded impurities therein. While it is preferred to maintain the amount of reflux in the range of 10 to 50% of the melt, it is feasible to operate with a reflux as low as 5% and as high as 60% in some instances.

The process and apparatus of the invention are applicable to a vast number of simple binary and complex multi-component systems. It is applicable to mixtures of compounds which have practically the same boiling point and also the same freezing point or to mixtures which have quite diverse boiling and freezing points. From a consideration of the phase diagram of a binary system which forms a eutectic it is obvious that either component (depending upon the location of the specific mixture on the diagram) may be separated by freezing until the concentration of the mother liquor reaches the approximate eutectic point. It is also apparent that effective separation of the components may be made from systems where the concentration of one component is relatively high, such as 97 or 98%, or where the concentrations of the components are about equal. One particularly advantageous application of the process lies in the purification of a component of, say, 95 to 98% purity so as to effect a purity upwards of 99.9%. In order to illustrate a few of the systems to which the invention is applicable, the following compounds are grouped with respect to their close boiling points:

Group A

| | B. P., °C. | F. P., °C. |
|---|---|---|
| Benzene | 80 | 5.5 |
| n-hexane | 69 | −94 |
| n-heptane | 98.52 | −90.5 |
| Carbon tetrachloride | 77 | −22.8 |
| Acrylonitrile | 79 | −82 |
| Ethyl alcohol | 78.5 | −117.3 |
| 2,2-dimethylpentane | 79 | −125 |
| 3,3-dimethylpentane | 86 | |
| Methyl ethyl ketone | 79.6 | −86.4 |
| Methyl propionate | 79.9 | −87.5 |
| Methyl acrylate | 80.5 | |
| 1,3-cyclohexadiene | 80.5 | −98 |
| 2,4-dimethylpentane | 80.8 | −123.4 |
| 2,2,3-trimethylbutane | 80.9 | −25 |
| Cyclohexane | 81.4 | 6.5 |
| Acetonitrile | 82 | −42 |
| Cyclohexene | 83 | −103.7 |
| 2-methylhexane | 90 | −119 |
| 3-methylhexane | 89.4 | −119.4 |

Group B

| | B. P., °C. | F. P., °C. |
|---|---|---|
| Methyl cyclohexane | 100.3 | −126.3 |
| Cyclohexane | 81.4 | 6.5 |
| n-heptane | 98.52 | −90.5 |
| 2,2,4-trimethylpentane (isooctane) | 99.3 | −107.4 |
| Nitromethane | 101 | −29 |
| p-dioxane | 101.5 | 11.7 |
| 2-pentanone | 101.7 | −77.8 |
| 2-methyl-2-butanol | 101.8 | −11.9 |
| 2,3-dimethylpentane | 89.4 | |
| 3-ethylpentane | 93.3 | −94.5 |

Group C

| | B. P., °C. | F. P., °C. |
|---|---|---|
| Toluene | 110.8 | −95 |
| Methylcyclohexane | 100.3 | −126.3 |
| 2,2,3,3-tetramethyl butane | 106.8 | 104 |
| 2,5-dimethylhexane | 108.25 | −91 |
| 2,4-dimethylhexane | 110 | |
| 2,3-dimethylhexane | 113.9 | |
| 3,4-dimethylhexane | 116.5 | |
| 3-ethyl-2-methylpentane | 114 | |
| 3-ethyl-3-methylpentane | 119 | |

Group D

| | B. P., °C. | F. P., °C. |
|---|---|---|
| Aniline | 184.4 | −6.2 |
| Toluene | 110.8 | −95 |
| Benzene | 80.0 | 5.5 |

Group E

| | B. P., °C. | F. P., °C. |
|---|---|---|
| Carbon tetrachloride | 77 | −22.8 |
| Chloroform | 61 | −63.5 |
| CS₂ | 46.3 | −108.6 |
| Acetone | 56.5 | −95 |

Group F

| | B. P., °C. | F. P., °C. |
|---|---|---|
| Ortho-xylene | 144 | −27.1 |
| Meta-xylene | 138.8 | −47.4 |
| Para-xylene | 138.5 | 13.2 |

Group G

|  | B. P., °C. | F. P., °C. |
|---|---|---|
| Ortho-cymene | 175.0 | −73.5 |
| Meta-cymene | 175.7 | <−25 |
| Para-cymene | 176.0 | −73.5 |

Systems consisting of any combination of two or more of the components within any one of the groups may be separated by the process of the invention as well as systems made up of components selected from different groups; for example, benzene may be separated from a benzene-n-hexane or n-heptane system in which the benzene is present in an amount greater than the eutectic concentration. In the same manner, para-xylene may be readily separated from a mixture of para- and meta-xylenes or from para-, meta-, and ortho-xylenes. Benzene may also be separated from toluene and/or aniline. Multi-component systems which may be effectively separated so as to recover one or more of the components in substantially pure form include 2,2-dimethylpentane, 2,4-dimethylpentane, 2,2,3-trimethylbutane; methyl cyclohexane, 2,2,4-trimethlypentane; and carbon tetrachloride, chloroform, acetone. The invention is also applicable to the separation of individual components from a system of cymenes and a system including the xylenes.

It should be understood that many so called binary systems also include small percentages of one or more other compounds as impurities which may be practically disregarded as far as operation of the process is concerned since they do not freeze out with the crystals but are retained in the mother liquor. So, in reality, most binary systems are multi-component systems in which one or more components are present in minor amounts not materially changing the separation from that in a true binary system.

Figure 2:
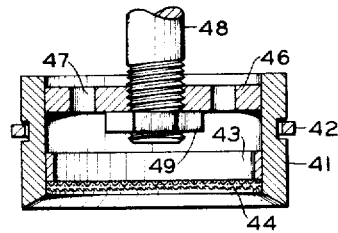
Figure 3:
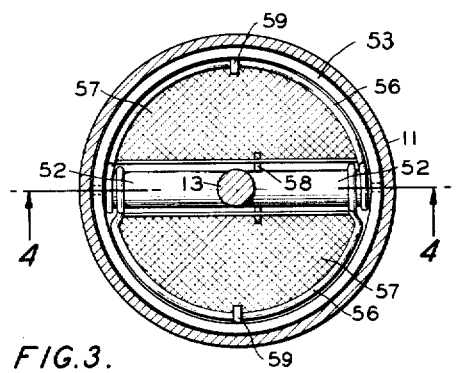
Figure 4:
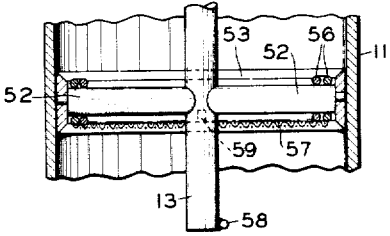

For a more complete comprehension of the invention, reference may be had to the drawing, of which Figure 1 is a diagrammatic showing of an elevational view, partly in section, of one modification of the apparatus of the invention. Figure 2 is a longitudinal cross-section of one modification of a porous or perforate piston for the apparatus of Figure 1. Figure 3 is a transverse cross-section of a purification column showing another modification of a porous piston positioned therein. Figure 4 is a partial longitudinal section of the purification column taken on the line 4—4 of Figure 3. Figure 5 shows diagrammatically in elevation another modification of the apparatus of the invention. Figure 6 is a solid-liquid phase diagram of a ternary system consisting of para-, ortho-, and meta-xylenes.

Referring to Figure 1, 11 designates a vertically elongated crystal purification column equipped with a reciprocable porous piston 12 controlled by reciprocating rod 13 extending between piston 12 and a piston (not shown) in air cylinder 14. Air under pressure is fed into air cylinder 14 alternately through lines 16 and 17 so as to apply pressure on alternate sides of the piston therein and thereby operate piston 12.

Piston 12 is equipped with a ring 18 which fits closely to the inner wall of column 11. Column 11 is also provided with a heating coil 19 positioned in the lower part of the column. A product withdrawal line 21, containing valve 22, communicates with the lower end of column 11. Line 23, communicating with the upper end of column 11, serves to withdraw reflux melt which passes upwardly through column 11 and through the pores or perforations in piston 12. A freezing exchanger 24 is equipped with a reciprocable piston 26 which is operated in cylinder 27 by motor 28 through connecting rod 29 and piston rod 31 through eccentric 32 on motor 28 to force a crystal slurry through cylinder 27 into a filter 33. A feed line 34 connects with the interior of cylinder 27 for introduction of feed material thereto. Reflux melt from column 11 can be recycled to feed line 34 through line 23.

Filter 33 separates the crystals from the liquid in the slurry fed thereto through cylinder 27, the filtrate exhausting through line 36, and the crystals passing on into column 11 through conduit 37. Lines 38 and 39 serve to introduce and withdraw refrigerant from freezing exchanger 24.

Figure 2 shows a piston 41 equipped with an expansible ring 42 adapted to fit the inner wall of the purification column. The piston 41 is equipped with a fixed ring 43 which holds a filtering screen 44 completely across the opening in the piston. A plate or diaphragm 46 extending across the opening in the piston skirt contains perforations or openings 47 for passing liquid reflux or melt therethrough on the compression stroke of the piston. Piston rod 48 passes through plate or diaphragm 46 to which it is threaded and further secured by a nut 49. Filtering screen 44 is made of brass or other non-corrodable material and may be covered with filtering fabric of any suitable material, however, wire screen of a fineness of 30 to 150-mesh will permit liquid to pass while retaining crystals in the column in practically all applications to crystal purification. The essential requirement of the perforate piston is that it be liquid-pervious and crystal-impervious under operating conditions.

In Figure 3 numeral 11 refers to the wall of the crystal purification column such as that shown in Figure 1. The piston rod 13 connects through spokes 52 to solid ring 53 which fits in close but slidable relation to the column wall. The porous or perforate portion of the piston comprises two foldable hinged segments formed by semi-circular rings 56 and screens 57. The semi-circular rings or frames 56 are looped around the spokes 52 at both ends in rotatable relation thereto so as to permit the hinged segments to fold inwardly on the intake stroke of the piston against stop bar 58. Lugs 59, fastened to ring 53, serve to hold the hinged segments in closed position on the compression stroke of the piston.

In Figure 4, which is a cross-section of the column and piston shown in Figure 3 taken on the line 4—4, the elements of the apparatus have the same reference numerals as those in Figure 3. It is necessary when utilizing this type of piston to extend the piston rod a short distance on the compression side of the piston so as to provide a means of holding stop bar 58. Stop bar 58 permits the hinged segments of the piston to rotate inwardly till they are just short of the parallel position; therefore, these hinged segments automatically close when forced against the column of crystals on the compression stroke and rest against lugs 59, but readily open on the intake stroke to allow crystals to pass into the column to the compression side of the piston.

Figure 5 shows diagrammatically another modification of the invention than that shown in Figure 1. Piston 12 is solid or liquid-impervious and the reflux melt is withdrawn through a perforate filtering section 61 of the column wall which is surrounded by a liquid imperforate bustle ring 62 to which reflux recycle line 23 connects. In this modification a portion of the melt is removed as higher melting product through line 21 and a portion is forced out through filtering section 61 into bustle ring 62 on the downstroke or compression stroke of the piston. Instead of utilizing a reciprocable piston for forcing crystals into column 11, this modification utilizes an auger or screw conveyor 63 actuated by motor 64. The freezing out of crystals is effected by a freezing exchanger 24 similar to that shown in Figure 1. This freezing exchanger is provided with a screw or auger type feeder 66 operated by motor 67 which moves the crystal slurry into rotary filter 33. Filter 33 connects through conduit 68 with auger device 63 for delivery of crystals thereto substantially free of mother liquor. The liquid fraction separated in filter 33 is recovered through line 36.

Heating means 19 may be any type direct or indirect heat-exchanger such as an electric heater or a coil of tubing through which a heating fluid is circulated. The heating coil may be wound on the outside of the column but on commercial type apparatus utilizing larger columns internal heaters are preferable because they can be arranged to distribute the heat over the entire horizontal cross-sectional area of the column. The feed may be passed through the heating coil, thereby partially cooling the feed and melting the crystals.

A solid-liquid phase diagram for the three xylenes is shown in Figure 6 of the drawing. The effect of temperature should actually be shown as a fourth coordinate giving a solid tetrahedron. Because of the inconvenience of a 3-dimensional diagram for practical purposes, the temperature is projected onto the base of the tetrahedron and a plane diagram is obtained. Utilization of the diagram requires the addition of freezing point temperatures to the mixtures of interest. Xylenes from coke-oven operation have the following composition:

|  | Liquid Volume Percent | Specific Gravity |
|---|---|---|
| Para-xylene | 20.1 | 0.8611 |
| Meta-xylene | 45.0 | 0.8684 |
| Ortho-xylene | 26.2 | 0.8745 |
| Ethyl benzene | 1.7 | 0.8669 |
| Paraffins | 7.0 |  |
|  | 100.0 |  |

The ethyl benzene and paraffins, having very low freezing points, may be added to the meta-xylene content. This gives a composition as follows:

|  | Percent |
|---|---|
| Para- | 20.1 |
| Meta- | 53.7 |
| Ortho- | 26.2 |
|  | 100.0 |

Since densities are about equal, it can be assumed that liquid volume per cent equals mol per cent or weight per cent.

The above composition is located on Figure 6. The diagram indicates that para-xylene will start freezing out when the mixture is cooled to −40° F. and will continue to separate out, as indicated by solid line AB, until the para-meta eutectic is reached at a temperature of about −83° F. At this temperature, a mixture of meta- and para- freezes out. So if it is desired to obtain only para-xylene, cooling is stopped at about −80° F. To calculate the amount of para- frozen out and recovered, assume a feed as follows:

|  | Pounds |
|---|---|
| Para- | 20.1 |
| Meta- | 53.7 |
| Ortho- | 26.2 |
|  | 100.0 |

The diagram indicates that cooling the above mixture to −80° F. gives solid para- plus a liquid of the following composition:

|  | Percent |
|---|---|
| Para- | 8.0 |
| Meta- | 62.0 |
| Ortho- | 30.0 |
|  | 100.0 |

The liquid phase still contains 53.7 pounds of meta- since none was frozen out. Meta- is now 62.0% of the liquid phase, so the amount of liquid phase is $$\frac{53.7}{62.0}$$

or 86.5 pounds. The difference must be the weight of para- frozen out or 100−86.5 which is 13.5 pounds para- recovered per 100 pounds of feed. Pure para-xylene may thus be produced continuously from a mixture of coke-oven xylenes.

It can readily be seen that a second separation can be effected from the xylenes system after freezing out about 13.5 pounds of para- by cooling the mother liquor further and freezing out a mixture of para- and meta-.

In order to provide a more comprehensive conception of the invention, the following specific examples are presented.

EXAMPLE I

A vertical crystallizer consisting of an eight-foot column made of 30 mm. Pyrex glass with a freezing section at the top and a melting section at the bottom was set up. A feed inlet was positioned near the top of the adiabatic section and a spiral scraper was provided for scraping the crystals from the wall of the crystallizer. A two-component hydrocarbon feed mixture consisting of 50 weight per cent benzene and the balance n-hexane was fed into the column and the temperature in the freezing section was maintained at approximately −90° F. Crystals descended through the adiabatic section and were melted by application of heat at the bottom of the column. The free-flowing movement of the crystals downward displaced liquid previously formed from the melting of the crystals, causing the flow of melt upwardly through the descending crystals and thereby establishing countercurrent flow of crystals and melt. Melted crystal product was withdrawn at the bottom of the column at a measured rate while the liquid product overflowed through a connection above the freezing section. A summary of the experimental data obtained is given in Table I.

*Table I*

| Run Number | Feed Rate, Ml./Min. | Compositions, Wt. Percent Benzene | |
|---|---|---|---|
|  |  | Crystal Product | Liquid Product |
| V-3 | 6.0 | 94 | 12 |
| V-5 | 4.0 | 96 | 20 |
| V-6 | 4.0 | 96 | 10 |

Due to the sluggish settling of the benzene crystals, the establishment of equilibrium was prolonged, and only a meager rate of crystal product removal was possible.

EXAMPLE II

A horizontal crystallizer consisting of a five-foot length of brass tubing with a freezing jacket at one end, a melting jacket at the other end, and a 31-inch insulated adiabatic section between the two jackets was set up and different benzene-n-hexane systems in which the benzene ranged from 48 to 64% of the feed were introduced in separate runs into the crystallizer at a point intermediate the freezing and melting sections. A constant liquid level was maintained in the crystallizer trough during the runs by liquid product overflow through a connection at the freezing section end of the crystallizer. Porous paddles faced with 50-mesh brass screens attached to a V-belt moved along the top of the crystallizer, entered the freezing section, and moved slowly to the warm end through a ¾-inch slot cut along the length of the tube. Crystals were formed in the freezing section, moved by the paddles through the adiabatic section to the warm end, and melted. The crystal product was withdrawn through a connection at the melting section end of the crystallizer at a rate controlled by means of a needle valve. A small amount of melted crystal product was removed in this manner while the greater portion of the liquid displaced by movement of crystals flowed countercurrently to them as liquid reflux. Data from representative runs are given in Table II.

*Table II*

| Run Number | Crystal Product Rate, Ml./Min. | Liquid Product Rate, Ml./Min. | Compositions, Wt. Percent Benzene | | | Paddle Speed, Inches per Minute |
|---|---|---|---|---|---|---|
| | | | Feed | Crystal Product | Liquid Product | |
| H-32 | 0.8 | 6.8 | 40.2 | 96.2 | 17.5 | 4 |
| H-29 | 0.8 | 3.8 | 44.7 | 97.0 | 15.3 | 4 |
| H-14 | 1.4 | 2.3 | 56.0 | 96.0 | 35.0 | 17 |
| H-10 | 1.6 | 3.0 | 64.0 | 97.0 | 36.0 | 8 |

EXAMPLE III

Runs were made on the separation of para-xylene from a para-meta-xylene system in the five-foot horizontal crystallizer of Example II operating in a similar manner. The data obtained are given in Table III.

*Table III*

| Run Number | Feed Rate, Ml./Min. | Composition, Para-meta Xylene | | | Crystal Product Rate, Ml./Min. | Paddle Speed, Inches per Minute |
|---|---|---|---|---|---|---|
| | | Feed | Crystal Maximum | Product Average | | |
| H-33 | 4 | 46.5 | 49.0 | 48.4 | 0.2 | 4 |
| H-34 | 6 | 46.5 | 52.0 | | 0.3 | 4 |

EXAMPLE IV

A 2-inch-diameter 24-inch-tall uninsulated glass column equipped with an electric resistance heater wound over the lower portion of the column was used in effecting the separation of para-xylene from a para-xylene, meta-xylene system in what can be considered a batch-type process. Precrystallized and filtered feed was manually introduced into the top of the column as needed to maintain the column nearly full of crystals. The crystals were manually compressed in the column by means of a porous piston faced with filter cloth. Crystals were melted at the bottom of the column by the heater. Some of the melt was withdrawn directly from the melting section as a high purity product while the remainder was displaced upward countercurrent to the bed of crystals, through the porous piston, and was removed from the column by means of a suction line connected to a vacuum flask. The feed mixture was precrystallized in a small batch crystallizer using a Dry Ice, heptane-acetone-coolant mixture. Data obtained in the two runs made are given in Table IV.

*Table IV*

| Run Number | Compositions Wt. Percent Para-xylene | | Feed Rate, Gal./Hr. | Higher Melting Product Yield, Wt. Percent |
|---|---|---|---|---|
| | Feed | Higher Melting Product | | |
| FM-3 | 80.0 | 99.17 | 2.4 | 16.7 |
| FM-4 | 77.0 | 99.64 | 1.5 | 27.1 |

EXAMPLE V

Benzene was separated from a benzene-n-heptane system in accordance with the procedure and in the apparatus of Example IV. The benzene concentration in the feed was 79.5 weight per cent, and in the purified product the concentration of benzene was 99%. Benzene was recovered at a purity of 99% and at a rate of 0.9 gallon per hour.

EXAMPLE VI

A 2-inch-diameter 18-inch-tall insulated brass column equipped with an electric resistance heater wound over four inches of the lower portion of the column was set up in vertical position and utilized in the separation of benzene from benzene-n-heptane systems of different compositions, all of which were on the benzene side of the eutectic point on the phase diagram. The operation and construction of the brass column was similar to that of the glass column in Example IV except that the porous piston was driven by a reciprocating air cylinder and a side arm connection was provided for the introduction of precrystallized and filtered feed. The 3-inch-diameter 18-inch-stroke air cylinder was controlled by means of a Flexipulse timer and 4-way air valve. It developed a force of approximately 200 pounds with the air pressure employed. The 2-inch-diameter side arm connection was provided with a funnel for introduction of precrystallized feed and a solid piston feeder to force crystals into the column. These crystals had been previously formed by cooling a charge of the feed of sufficient volume for the run in a coolant bath with manual stirring. After the column was well packed with crystals, the stroke of the porous piston decreased from 6 to 8 inches. The pressure of the porous piston faced with filter cloth forced liquid up through the bed of crystals and through the cloth. The cloth filter medium gave a satisfactory separation of the liquid and crystal phases with the benzene-n-heptane system. Most of the liquid trapped above the porous piston then overflowed through the recycle connection at the top of the column on the withdrawal stroke of the piston. Additional crystal feed was then forced by the solid feeder piston into the void in the column formed by removal of the porous piston and the recycle repeated. Data obtained in the various runs are given in Table V.

*Table V*

| Run Number | Compositions, Wt. Percent Benzene | | Feed Rate, Gal./Hr. | Higher Melting Product Rate, Gal./Hr. |
|---|---|---|---|---|
| | Feed | Higher Melting Product | | |
| FM-7 | 70.0 | 99+ | 2.6 | 0.3 |
| FM-8 | 76.7 | 99+ | 2.2 | 0.6 |
| FM-9 | 69.4 | 99 | 5.1 | 0.9 |
| FM-10 | 48.0 | 99 | (ᵃ) | |
| FM-13 ᵇ | 53.7 | 99+ | 6.7 | 0.9 |

ᵃ This test was made to determine whether or not a high purity benzene product could be produced with a lower benzene concentration feed stock.
ᵇ In test FM-13 the solid-piston feeder was replaced with a hollow piston feeder faced with 50-mesh screen and to which a vacuum was applied. In this manner the feed was prefiltered in order to introduce semisolid crystals to the column.

It can be readily seen from a comparison of the data presented in Examples I, II, and III with the data given in Examples IV, V, and VI that the process and apparatus of the invention, even when utilizing a considerably smaller apparatus, effects the production of a product of considerably higher purity and at vastly greater rate. By calculation it can be determined that the product flow rate of 0.9 gallon per hour amounts to approximately 60 ml. per minute. It is therefore apparent that the rate of product recovery is at least 38 times and up to 300 times that obtained in processes in which a crystal slurry is gradually moved through the reflux liquid without maintaining crystals in a compact column.

The illustrative details set forth herein are not to be construed as imposing unnecessary limitations upon the invention, the scope of which is set forth in the claims.

I claim:

1. A process for recovering and purifying a crystalline material from a liquid mixture which comprises subjecting said liquid mixture to cooling so as to freeze out crystals of said material; separating resulting crystals from mother liquor; introducing the resulting concentrated crystals into an elongated purification zone and compressing said crystals toward one end thereof so as to form a compact column of crystals in said end; melting the forward end of said column of crystals; removing only a portion of the resulting melt so as to force a portion thereof back through said column of crystals as reflux and washing occluded impurities therefrom; removing a liquid stream comprising reflux liquid and occluded impurities from said purification zone through a single crystal-impervious, liquid-impervious filter zone disposed across said purification zone at the compression end of said column of crystals.

2. The process of claim 1 in which said filter zone is reciprocated in said column so as to simultaneously compress said crystals.

3. A process for the separation and purification of at least one of the components of a liquid mixture which comprises crystallizing at least one but not all of said components; separating resulting crystals and uncrystallized material; introducing crystals of said crystallized material into an upstream portion (with respect to crystal movement) of an elongated purification zone; compressing said crystals toward one end of said zone as a compact mass; melting at least a portion of said compact crystal mass in the downstream end portion (with respect to crystal movement) of said purification zone; displacing a portion of resulting melt countercurrently through at least a portion of the length of said crystal mass so as to displace occluded impurities therefrom; removing displaced liquid from an upstream end portion (with respect to crystal movement) of said purification zone; and removing a purified product from the downstream end portion of said purification zone.

4. The process of claim 3 in which said liquid mixture comprises para- and meta-xylenes.

5. The process of claim 4 in which para-xylene is separated as the pure product.

6. The process of claim 3 in which said liquid mixture comprises a mixture of para-, ortho-, and meta-xylenes.

7. The process of claim 6 in which para-xylene is separated as the pure product.

8. The process of claim 3 in which said liquid mixture comprises a mixture of para-, ortho-, and meta-cymenes.

9. The process of claim 8 in which meta-cymene is separated as the pure product.

10. The process of claim 3 in which said liquid mixture comprises a mixture of 2,2-dimethyl pentane, 2,4-dimethyl pentane, and 2,2,3-trimethyl butane.

11. The process of claim 3 in which said liquid mixture comprises benzene and n-heptane.

12. The process of claim 11 in which benzene is separated as the pure product.

13. The process of claim 11 in which said liquid mixture comprises methylcyclohexane, n-heptane, and benzene.

14. The process of claim 3 in which said liquid mixture comprises benzene and n-hexane.

15. A process for the separation and purification of at least one of the components of a liquid mixture which comprises crystallizing at least one but not all of said components; compacting crystallized material so formed so as to displace liquid therefrom; removing liquid so displaced from said crystallized material; introducing crystals of said compacted crystallized material into an elongated purification zone; compressing said crystals toward one end of said purification zone as a compact mass by a compacting means operative in response to fluid pressure; melting at least a portion of said compact crystal mass in the downstream end portion (with respect to crystal movement) of said purification zone; displacing a portion of resulting melt countercurrently through at least a portion of the length of said crystal mass so as to displace occluded impurities therefrom; removing displaced material from an upstream portion (with respect to crystal movement) of said purification zone; and removing a purified product from the downstream end portion of said purification zone.

16. The process of claim 15 in which at least a portion of the melting of the crystal mass is obtained by indirect heat exchange with the feed to said crystallizing step, whereby said feed is cooled during the melting of said crystal mass.

17. The process of claim 15 in which at least a portion of the liquid removed from an upstream portion of said purification zone is removed through a filter in the side wall in said purification zone.

18. The process of claim 15 in which at least a portion of the liquid removed from an upstream portion of said purification zone is removed through a filter in means used to compact said crystals in said zone.

19. A process for the separation and purification of at least one of the components of a liquid mixture which comprises crystallizing at least one but not all of said components; filtering crystals of said crystallized material on the surface of a rotary filter so as to remove mother liquor therefrom; removing said crystallized material from said filter; introducing crystals of said crystallized material into the upper portion of an upright, elongated, purification zone; compacting said crystals and moving them downwardly through said purification zone to a melting zone in a lower end portion of said purification zone; melting a portion of said crystals in said melting zone; displacing a portion of resulting melt countercurrently through at least a portion of the length of said crystal mass so as to displace occluded impurities therefrom; removing displaced material from an upper portion of said purification zone; and removing a purified product from the lower end of said purification zone.

References Cited in the file of this patent

UNITED STATES PATENTS

| Number | Name | Date |
| --- | --- | --- |
| 1,906,534 | Burke | May 2, 1933 |
| 2,301,965 | Dons et al. | Nov. 17, 1942 |
| 2,302,195 | Dons et al. | Nov. 17, 1942 |
| 2,324,869 | Oman | July 20, 1943 |
| 2,438,368 | Keeling | Mar. 23, 1948 |
| 2,533,232 | Dressler | Dec. 12, 1950 |
| 2,541,682 | Arnold | Feb. 13, 1951 |
| 2,615,793 | Weedman | Oct. 28, 1952 |
| 2,617,274 | Schmidt | Nov. 11, 1952 |

UNITED STATES PATENT OFFICE

CERTIFICATE OF CORRECTION

Patent No. 2,747,001                                                     May 22, 1956

John A. Weedman

It is hereby certified that error appears in the above numbered patent requiring correction and that the said Letters Patent should read as corrected below.

In the drawings, Sheet 2, Fig. 6, for "CRYSTILLATION" read -- CRYSTALLIZATION --; in the printed specification, column 11, line 13, for "liquid-impervious" read -- liquid-pervious --.

Signed and sealed this 28th day of August 1956.

(SEAL)

Attest:

KARL H. AXLINE

Attesting Officer                                               ROBERT C. WATSON
                                                                                  Commissioner of Patents